May 12, 1931.　　　P. S. HASELTON　　　1,805,457
METHOD FOR CUTTING GLASS
Filed April 17, 1929
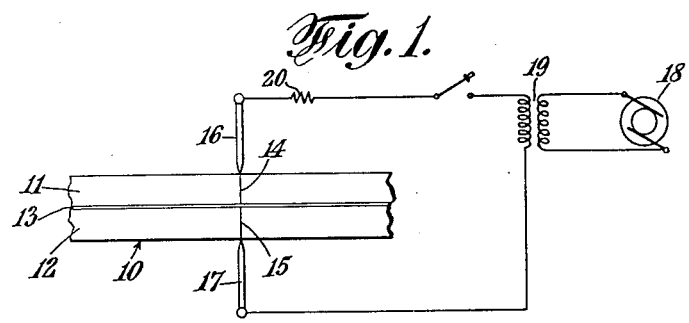
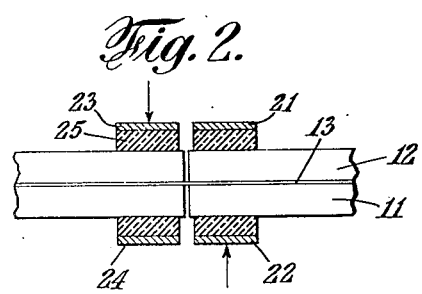
INVENTOR
Page S. Haselton.
BY
ATTORNEYS Patented May 12, 1931 1,805,457

UNITED STATES PATENT OFFICE

PAGE S. HASELTON, OF UPPER MONTCLAIR, NEW JERSEY, ASSIGNOR TO BESSIE L. GREGG, OF FOREST HILL GARDENS, NEW YORK

METHOD FOR CUTTING GLASS

Application filed April 17, 1929. Serial No. 355,738.

This invention relates to processes and apparatus for severing and trimming glass, the invention being particularly adaptable to the cutting of laminated glass comprising a plurality of layers of glass between which a layer or layers of shatter preventing material are interposed.

Various further and more specific features, objects and advantages will clearly appear from the detailed description given below, taken in connection with the accompanying drawings which form a part of this specification and illustrate merely by way of example certain apparatus embodying the invention.

The invention consists in the novel features, arrangements, apparatus and methods as may be shown, described or claimed in connection with the embodiments of the invention herein disclosed by way of example.

In the drawings, Fig. 1 indicates somewhat schematically an arrangement of electrical apparatus for applying the invention to the cutting of laminated glass embodying the shatter preventing material in the form of cellulosic material, for example; and Fig. 2 illustrates additional apparatus and further features of the invention.

Apparatus has been heretofore devised making use of electrically heated conductors for example, for cracking the layers of laminated glass along the desired lines of separation. This invention is more particularly concerned with apparatus and methods for separating the cellulosic or other shatter preventing material along the desired line of separation after the glass has been cracked or cut along such line.

In Fig. 1 a portion of laminated glass is indicated at 10 comprising layers of glass 11 and 12, between which a layer of cellulosic, gelatinous or other shatter preventing material 13 is interposed. The layers of glass 11 and 12 are shown as having been cracked or severed along lines 14 and 15. The glass may be thus severed by the electrical heating process above referred to, or under certain circumstances comparatively satisfactory results may be obtained by the use of a diamond or other known means for cracking the glass along the desired lines. As shown in Fig. 1, however, the layer of shatter preventing material 13 is still intact.

A pair of electrodes is indicated at 16 and 17 for applying a high potential along the cracked lines 14 and 15 respectively, a generator being indicated at 18 and a transformer 19 as a source of the high potential. When a sufficient potential is applied to the electrodes in the position indicated, a spark or arc will be produced between the electrodes, causing a breakdown or disintegration of the shatter preventing material at the line of separation. In order that the material 13 may be separated along the desired line of separation, the electrodes if desired may be moved along such line while the potential is maintained, or if desired a plurality of sets of electrodes may be arranged along the desired line.

The particular potential and current values used will of course vary widely with the characteristics of the laminated glass, such as thickness and insulating efficiency of the shatter preventing material. Care should be taken that the arc or spark is not allowed to persist for a sufficient length of time at any one point on the glass to mar the glass or burn the shatter preventing material, except along a desired line. In furtherance of this precaution, the current supplied may be limited by a suitable impedance as at 20.

After the application of an electrical arc or spark as above described, the glass portions may be separated by hand, or in the event that the disintegration of the shatter preventing material has not been sufficient to permit such immediate separation by hand, the shatter preventing material may be sheared in the manner indicated in Fig. 2.

While the region of the glass along the cutting line is still warm from the effects of the electrical arc, or after the glass has been somewhat warmed in any desired manner, the two portions to be severed may be separated for at least a short distance as indicated in Fig. 2. That is, the two portions to be severed may be separated so as to leave a crevice of say one-thirtysecond of an inch width. If the glass portion is separated further than this, while the cellulosic or other shatter preventing material is at least partially intact at the cutting line, the shatter preventing material may possibly be drawn from between the glass layers to such an extent as to permanently damage the severed edges. However, with only a very limited separation of the glass portions prior to complete severance of the lamination 13, the severed edges including the cellulosic or other material remain substantially intact. After this initial slight separation has been effected, the cellulosic material may be readily sheared by a knife or band saw to complete the operation. If the layer 13 is to be sheared, apparatus as indicated in Fig. 2 may be utilized.

Rigid clamping members are indicated at 21, 22, 23 and 24 for respectively extending along the desired line of separation above and below the glass and each side of such line. In order that these clamping members may exert uniform pressure against the glass notwithstanding any slight irregularities in the glass, layers of rubber or other yielding means as indicated at 25 may be interposed between the clamping members and the glass. With the clamping members firmly secured in position, such portions of the layer 13 as are still adhering at the line of separation may be sheared by applying opposed forces to the clamping members at the respective sides of the cutting line as indicated by the arrows in Fig. 2.

While I have described my invention in detail and with respect to certain embodiments thereof, I do not desire to be limited to such details or forms, since many changes and modifications may be made and the invention may be embodied in other forms without departing from the spirit and scope of the invention in its broader aspects. Hence I desire to cover all modifications and forms coming within the language or scope of any one or more of the appended claims.

What I claim as new and desire to secure by Letters Patent is:

1. Process of severing laminated glass of which the laminations are secured together by shatter preventing electrical insulating material, which comprises first cracking the glass layers per se along the desired line of separation, and then subjecting the layer of shatter preventing material along said line to an electrical potential sufficient to cause breakdown of the insulating material.

2. Process of severing laminated glass of which the laminations are secured together by shatter preventing electrical insulating material, which comprises first cracking the glass layers per se along the desired line of separation, then subjecting the layer of shatter preventing material along said line to an electrical potential sufficient to cause breakdown of the insulating material, then slightly separating the glass portions, and finally shearing any of the adhering insulating material at the line of separation.

3. Process of severing laminated glass of which the laminations are secured together by shatter preventing material, which comprises cracking the layers of glass per se along the desired line of separation, subjecting the shatter preventing material at said line to conditions somewhat weakening the same, then slightly separating the glass portions by applying gripping means to the glass resiliently engaging the surfaces thereof at each side of the line of separation, and cutting the shatter preventing material at said line.

4. In the manufacture of laminated glass having layers of glass separated by a layer of cellulosic or other shatter preventing binding material, the process of removing the binding material along a desired line which comprises subjecting the material at said line to a substantially localized high temperature sufficient to cause burning thereof.

5. In the manufacture of laminated glass having layers of glass separated by a layer of cellulosic or other shatter preventing binding material, the process of removing the binding material along a desired line which comprises burning the material along said line by the application of an electrical arc thereto.

6. In the manufacture of laminated glass having layers of glass separated by a layer of cellulosic or other shatter preventing binding material, the process of removing the binding material within the zone of a predetermined line only which comprises subjecting the material within said zone to a substantially localized high temperature sufficient to cause substantially immediate disintegration of the material within said zone and before adjacent areas of the material are disturbed.

In testimony whereof I have signed my name to this specification.

PAGE S. HASELTON.